(12) United States Patent
Chang

(10) Patent No.: US 7,663,804 B2
(45) Date of Patent: *Feb. 16, 2010

(54) OPTICAL PLATE AND BACKLIGHT MODULE USING THE SAME

(75) Inventor: Shao-Han Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 131 days.

This patent is subject to a terminal disclaimer.

(21) Appl. No.: 11/861,310

(22) Filed: Sep. 26, 2007

(65) Prior Publication Data

US 2008/0278818 A1 Nov. 13, 2008

(30) Foreign Application Priority Data

May 8, 2007 (CN) .................. 2007 1 0200588

(51) Int. Cl.
*G02B 13/20* (2006.01)
*G02B 5/02* (2006.01)

(52) U.S. Cl. .................. 359/599; 362/84; 362/606

(58) Field of Classification Search ........... 359/599, 359/894

See application file for complete search history.

(56) References Cited

U.S. PATENT DOCUMENTS

| | | | | |
|---|---|---|---|---|
| 5,057,974 A | * | 10/1991 | Mizobe | ......... 362/26 |
| 5,852,514 A | * | 12/1998 | Toshima et al. | ......... 359/599 |
| 7,204,632 B2 | * | 4/2007 | Chen | ......... 362/613 |
| 7,287,891 B1 | * | 10/2007 | Park et al. | ......... 362/555 |
| 2002/0163790 A1 | * | 11/2002 | Yamashita et al. | ......... 362/31 |
| 2005/0152127 A1 | * | 7/2005 | Kamiya et al. | ......... 362/84 |
| 2007/0147073 A1 | * | 6/2007 | Sakai et al. | ......... 362/607 |

* cited by examiner

*Primary Examiner*—Thong Nguyen
(74) *Attorney, Agent, or Firm*—Frank R. Niranjan

(57) ABSTRACT

An exemplary optical plate includes a transparent plate unit. The transparent plate unit includes a light output surface, a bottom surface, a diffusion layer, and a lamp-receiving portion. The bottom surface is opposite to the light output surface. The diffusion layer is formed on the light output surface. The lamp-receiving portion is defined in the bottom surface. A backlight module using the present optical plate is also provided.

13 Claims, 9 Drawing Sheets

OPTICAL PLATE AND BACKLIGHT MODULE USING THE SAME

CROSS-REFERENCE TO RELATED APPLICATIONS

This application is related to nineteen co-pending U.S. patent applications, which are: application Ser. Nos. 11/835,425, 11/835,426, 11/835,427, 11/835,428, 11/835,429, 11/835,430, and 11/835,431, filed on Aug. 8, 2007, and all entitled "OPTICAL PLATE AND BACKLIGHT MODULE USING THE SAME", application Ser. No. 11/836,799 filed on August 10, and entitled "OPTICAL PLATE AND BACKLIGHT MODULE USING THE SAME", application Ser. No. 11/842,170, filed on Aug. 21, 2007, and entitled "OPTICAL PLATE AND BACKLIGHT MODULE USING THE SAME", applications Ser. Nos. 11/843,670 and 11/843,669, filed on Aug. 23, 2007, and both entitled "OPTICAL PLATE AND BACKLIGHT MODULE USING THE SAME", application Ser. No. 11/845,100, filed on Aug. 27, 2007, and entitled "OPTICAL PLATE AND BACKLIGHT MODULE USING THE SAME", application Ser. Nos. 11/845,790, 11/845,792, 11/845,793, and 11/845,794, filed on Aug. 28, 2007, all entitled "OPTICAL PLATE AND BACKLIGHT MODULE USING THE SAME", and application Ser. Nos. 11/850,040 and 11/850,041, filed on Sep. 5, 2007, both entitled "OPTICAL PLATE AND BACKLIGHT MODULE USING THE SAME", and application Ser. No. 11/861,311, filed on Sep. 26, 2007, and entitled "OPTICAL PLATE AND BACKLIGHT MODULE USING THE SAME". In all these co-pending applications excepting application Ser. No. 11/845,790, the inventor is Shao-Han Chang. In application Ser. No. 11/845,790, the inventor is Shao-Han Chang and Fen Chen. All of the co-pending applications have the same assignee as the present application.

BACKGROUND OF THE INVENTION

1. Field of the Invention

The present invention relates to an optical plate for use in, for example, a backlight module, the backlight module typically being employed in a liquid crystal display (LCD).

2. Discussion of the Related Art

In a liquid crystal display device, liquid crystal is a substance that does not itself radiate light. Instead, the liquid crystal relies on light received from a light source, in order that the liquid crystal can facilitate the displaying of images. In the case of a typical liquid crystal display device, a backlight module powered by electricity supplies the needed light.

FIG. 9 represents a typical direct type backlight module 100. The backlight module 100 includes a housing 101, a light reflective plate 102, a light diffusion plate 103, a prism sheet 104, and a plurality of light emitting diode 105 (hereinafter called LED). The housing 101 includes a rectangular base 1011 and four sidewalls 1013 extending from a periphery of the base 1011. The base 1011 and the four sidewalls 1013 cooperatively define a chamber 107. Each LED 105 includes a base portion 1053 and a light-emitting portion 1051 disposed on the base portion 1053. The LEDs 105 are electrically connected to a printed circuit board (not labeled), and the printed circuit board is fixed to the base 1011 of the housing 101. The light reflective plate 102 is disposed on the LEDs 105 in the chamber 107. The light reflective plate 102 defines a plurality of through holes (not labeled) that allows the light-emitting portions 1051 of the LED 105 to pass through and to emit light to be transmitted to the light diffusion plate 103. The light diffusion plate 103 is stacked on the prism sheet 104 in the chamber 107. Light emitted from the LEDs 105 is substantially reflected by the light reflective sheet 102 to the light diffusion plate, diffused uniformly in the light diffusion plate 103, and exit the prism sheet 104 as surface light.

Generally, a plurality of dark areas may occur because of the reduced intensity of light between adjacent LEDs 105. In the backlight module 100, each LED 105 further includes a reflective sheet 106 disposed on the top of the light-emitting portion 1051, configured for decreasing the brightness of a portion of the backlight module 100 above the LED 105. However, the brightness of the backlight module 100 is still not uniform.

What is needed, therefore, is a new optical plate and a backlight module using the optical plate that can overcome the above-mentioned shortcomings.

SUMMARY

An optical plate according to a preferred embodiment includes one or more transparent plate unit. The transparent plate unit includes a light output surface, a bottom surface, a diffusion layer, and a lamp-receiving portion. The bottom surface is opposite to the light output surface. The diffusion layer is formed on the light output surface. The lamp-receiving portion is defined in the bottom surface.

A backlight module according to a preferred embodiment includes a housing, a point light source, a reflective member and an optical plate. The housing includes a base and a plurality of sidewalls extending around a periphery of the base, the base and the sidewalls cooperatively forming an opening. The point light source is disposed on the base, each point light source having a light-emitting portion. The reflective member is positioned above the top of the light-emitting portion. The same optical plate as described in the previous paragraph is employed in this embodiment. The light-emitting portion of the point light source is inserted in the lamp-receiving portion of the optical plate correspondingly. The diffusion layer of the optical plate faces the opening of the housing.

Other advantages and novel features will become more apparent from the following detailed description of various embodiments, when taken in conjunction with the accompanying drawings.

BRIEF DESCRIPTION OF THE DRAWINGS

The components in the drawings are not necessarily drawn to scale, the emphasis instead being placed upon clearly illustrating the principles of the present optical plate and backlight module. Moreover, in the drawings, like reference numerals designate corresponding parts throughout several views, and all the views are schematic.

DETAILED DESCRIPTION OF THE PREFERRED EMBODIMENTS

Reference will now be made to the drawings to describe preferred embodiments of the present optical plate and backlight module, in detail.

Figure 1:
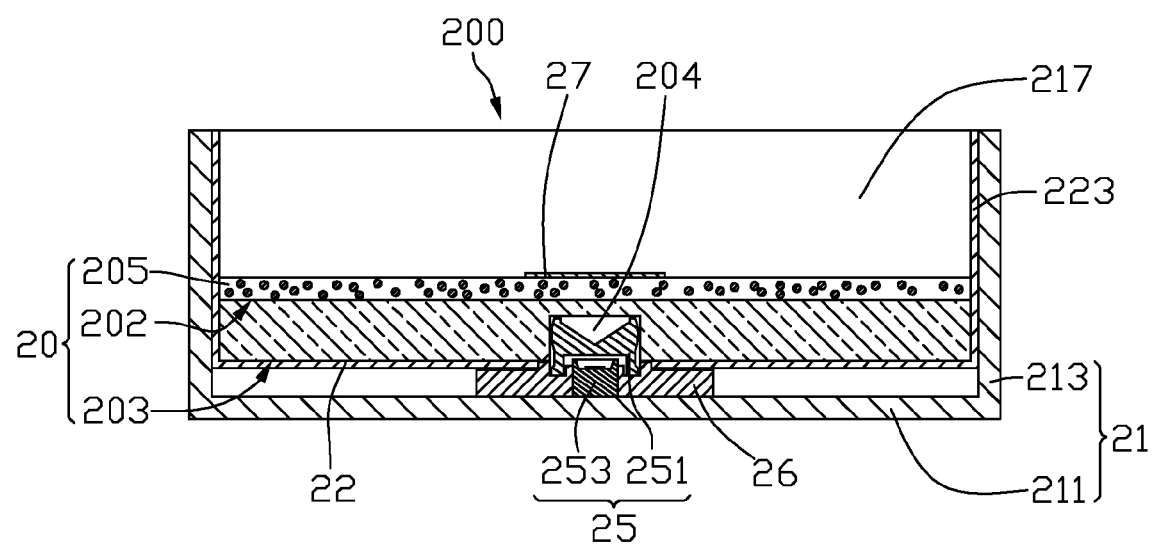
FIG. 1 is a side cross-sectional view of a backlight module using an optical plate according to a first preferred embodiment of the present invention.

Referring to FIG. 1, a backlight module 200 in accordance with a first preferred embodiment is shown. The backlight module 200 includes an optical plate 20, a housing 21, a light reflective plate 22, a LED 25, a printed circuit board 26, and a reflective member 27. The housing 21 includes a rectangular base 211 and four sidewalls 213 extending around a periphery of the base 211 correspondingly. The base 211 and the sidewalls 213 cooperatively form an opening 217. The optical plate 20, the light reflective plate 22, the LED 25 and the reflective member 27 are received in the housing 21.

Figure 2:
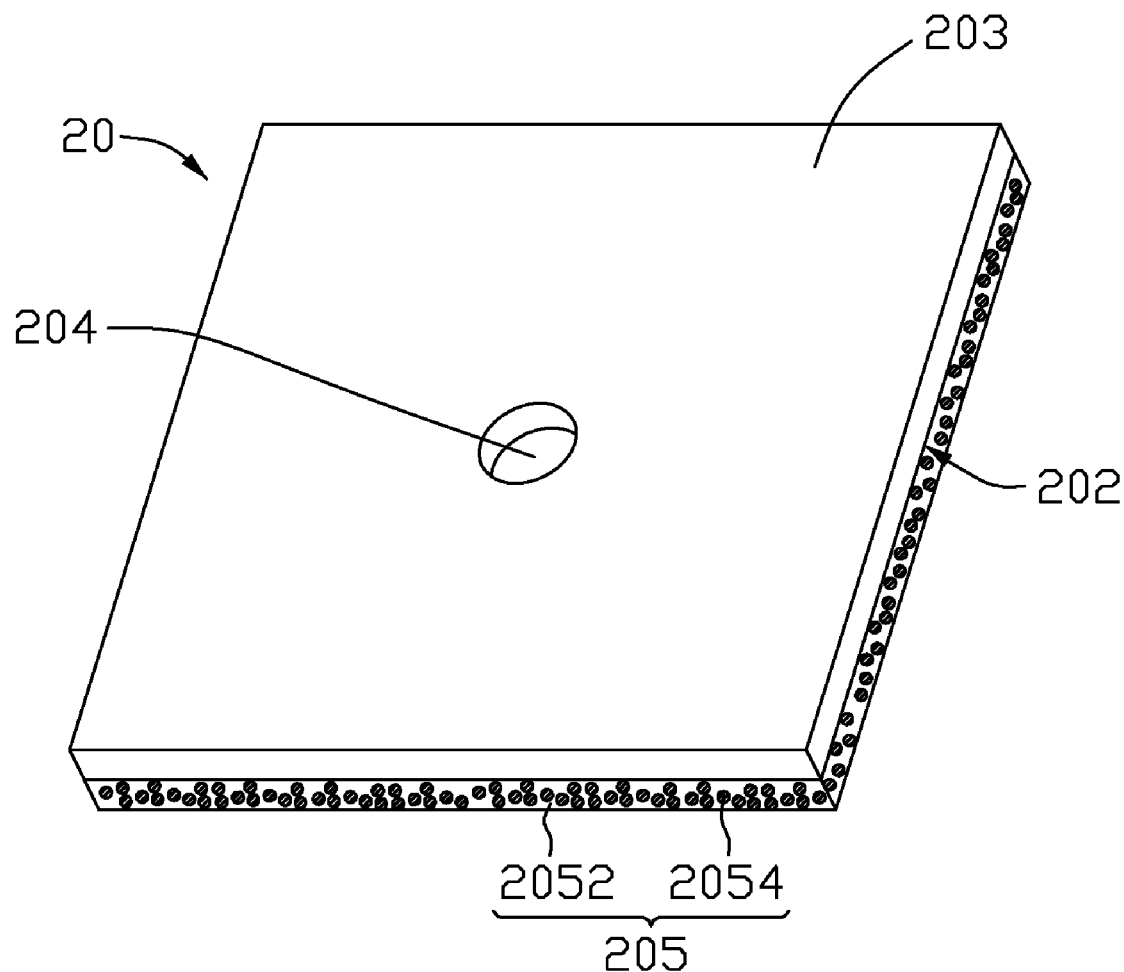
FIG. 2 is an isometric view of the optical plate of FIG. 1.

Referring to FIG. 2, the optical plate 20 can be mounted into the housing 21. The optical plate 20 is substantially a rectangular sheet, which includes a light output surface 202, a bottom surface 203, and a diffusion layer 205. The bottom surface 203 is at another side of the optical plate 20 opposite to the light output surface 202. The diffusion layer 205 is formed on the light output surface 202. The diffusion layer 205 has a uniform thickness and covers the light output surface 202 entirely. The optical plate 20 further includes a lamp-receiving portion 204 defined in a center of the bottom surface 203. In this embodiment, the lamp-receiving portion 204 is a blind hole that is depressed towards the light output surface 202.

The optical plate 20 can be made from transparent material selected from the group consisting of polycarbonate (PC), polymethyl methacrylate (PMMA), polystyrene (PS), copolymer of methylmethacrylate and styrene (MS), and any suitable combination thereof. The diffusion layer 205 includes transparent resin matrix material 2052, and diffusion particles 2054 uniformly dispersed in the transparent resin matrix material 2052. The light diffusion layer 22 is manufactured by solidifying an ink layer that is coated on the light output surface 202. The ink layer includes a varnish and a plurality of diffusion particles 2044 dispersed in the varnish. The varnish is preferably acrylic varnish. The transparent resin matrix material 2052 is made of acrylic resin from the varnish. The diffusion particles 2054 are selected from a group consisting of glass beads, silicon dioxide ($SiO_2$) particles, PMMA particles, and any combination thereof.

Referring to FIG. 1, the LED 25 includes a base portion 253, and a light-emitting portion 251 disposed on the base portion 253. The LED 25 is electrically connected to the printed circuit board 26 that is fixed to the base 211 of the housing 21. In the illustration embodiment, the reflective member 27 is a light reflective film that is positioned on the diffusion layer 205 of the optical plate 20. In an alternative embodiment, the reflective member 27 can be disposed on the top of the light-emitting portion 251, and the reflective member 27 and the LED 25 can be inserted into the blind hole of lamp-receiving portion 204 together. The optical plate 20 is positioned in the housing 21 such that the lamp-receiving portion 204 of the optical plate 20 receives the light-emitting portion 251 of the LED 25 and the light output surface 202 of the optical plate 20 faces the opening 217. The light reflective plate 22 defines a through hole (not labeled). The light reflective plate 22 is disposed underneath the bottom surface 203 of the optical plate 20, the LED 25 passing through the light reflective plate 22 via the through hole.

In use, light emitted from the light-emitting portion 251 of the LED 25 enters the optical plate 20 via an inner surface of the lamp-receiving portion 204. A significant amount of light travels to the optical plate 20. An amount of light is reflected at the light reflective plate 22, and finally exits the light output surface 202. Accordingly, a light energy utilization rate of the backlight module 200 is increased. In addition, light that exits the light output surface 202 can be further diffused in the diffusion layer 205 for improving a uniformity of light exiting the backlight module 200.

It should be pointed out that, the light reflective plate 22 can be omitted. In an alternative embodiment, a high reflectivity film can be deposited on inner surfaces of the base 211 and the sidewalls 213 of the housing 21. In other alternative embodiments, the housing 21 is made of metal materials and having high reflectivity inner surfaces.

It is to be understood that, in order to improve the brightness of the backlight module 200 at a specific range of viewing angles, the backlight module 200 can further include a transparent sheet (not shown) and a prism sheet (not shown) disposed on the top of the housing 21 over the opening 217 in that order. In addition, in order to improve light energy utilization rate of the backlight module 200, the light reflective plate 22 can further include four reflective sidewalls 223 extending around a periphery thereof, and the sidewalls 223 are in contact with the corresponding sidewalls 213 of the housing 21.

Figure 3:
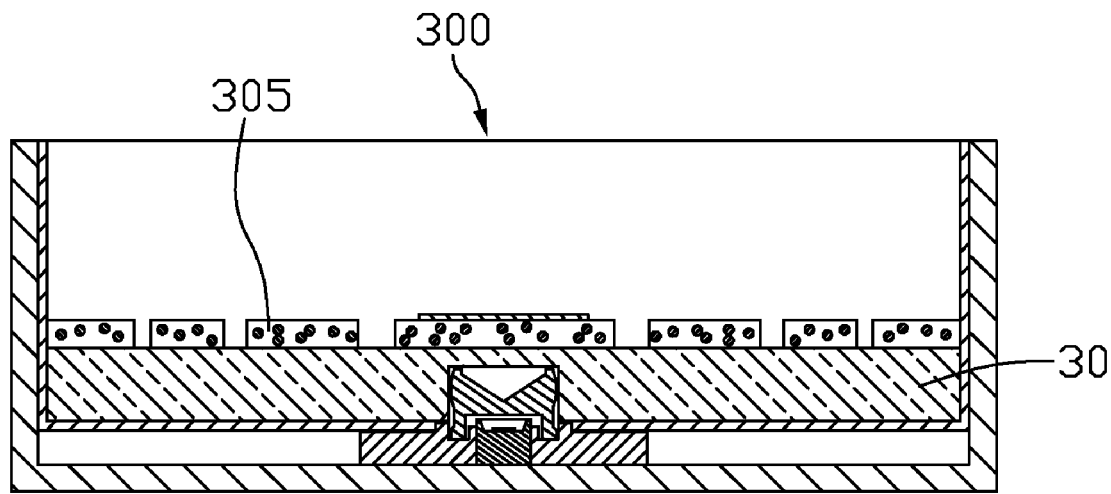
FIG. 3 is a side cross-sectional view of a backlight module according to a second preferred embodiment of the present invention.

Referring to FIG. 3, a backlight module 300 in accordance with a second preferred embodiment is shown. The backlight module 300 is similar in principle to the backlight module 200. However, a diffusion layer 305 of the optical plate 30 of the backlight module 300 is made up of a plurality of diffusion dots arranged apart in a random manner.

Figure 4:
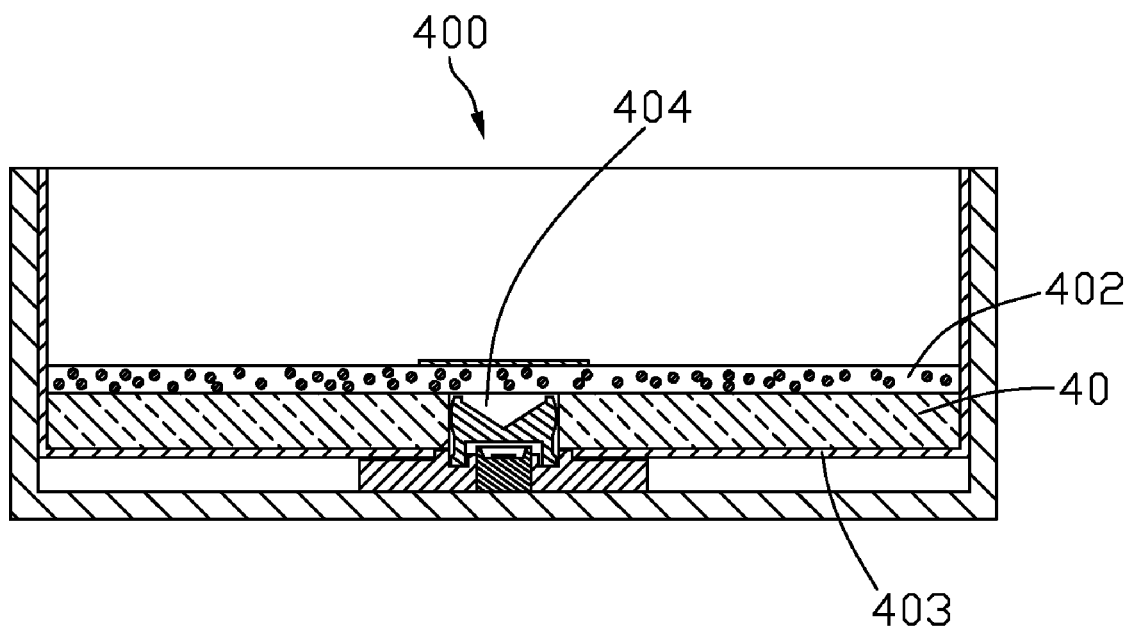
FIG. 4 is a side cross-sectional view of a backlight module according to a third preferred embodiment of the present invention.

Referring to FIG. 4, a backlight module 400 in accordance with a third preferred embodiment is shown. The backlight module 400 is similar in principle to the backlight module 200. However, in the optical plate 40, the lamp-receiving portion 404 is a through hole that runs through the bottom surface 403 and the light output surface 402.

In the other alternative embodiments, the diffusion layer of optical plate is made up of the plurality of diffusion dots arranged in other manners or made up of a plurality of different diffusion strips arranged in a predetermined manner as shown in FIGS. 5 through 8.

Figure 5:
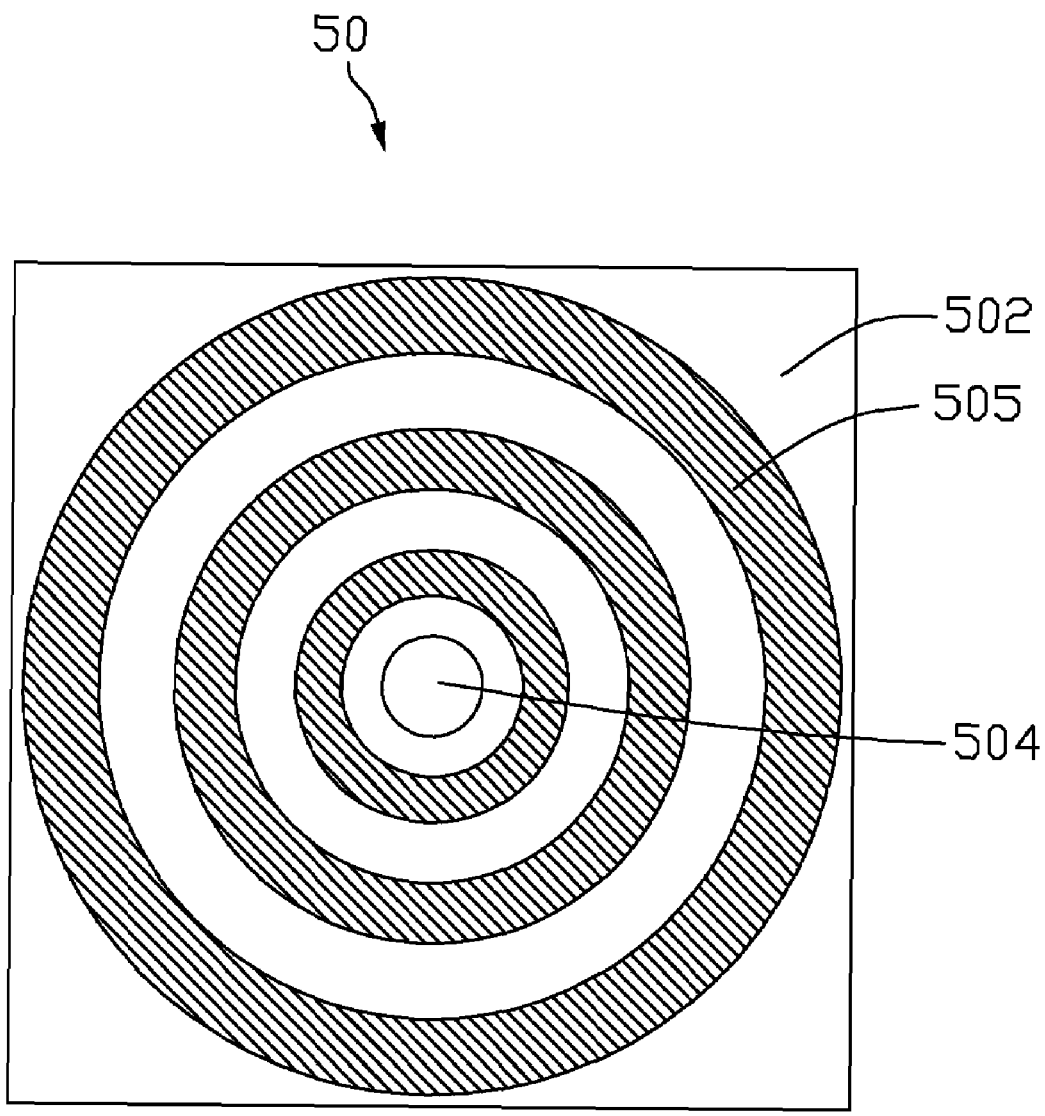
FIGS. 5 through 8 are top plan views of distributions of diffusion layer of the optical plate of the present invention.

Referring to FIG. 5, a first arrangement of the diffusion strips is shown. A diffusion layer 505 formed on a light output surface 502 of an optical plate 50 includes three (or more) circular strips. The circular strips each have a different radius and a center of each of the circular strips aligns within a portion of the lamp-receiving portion 504 of the optical plate 50. Furthermore, a radial thickness of each of the circular strips increases with increasing radius.

Figure 6:
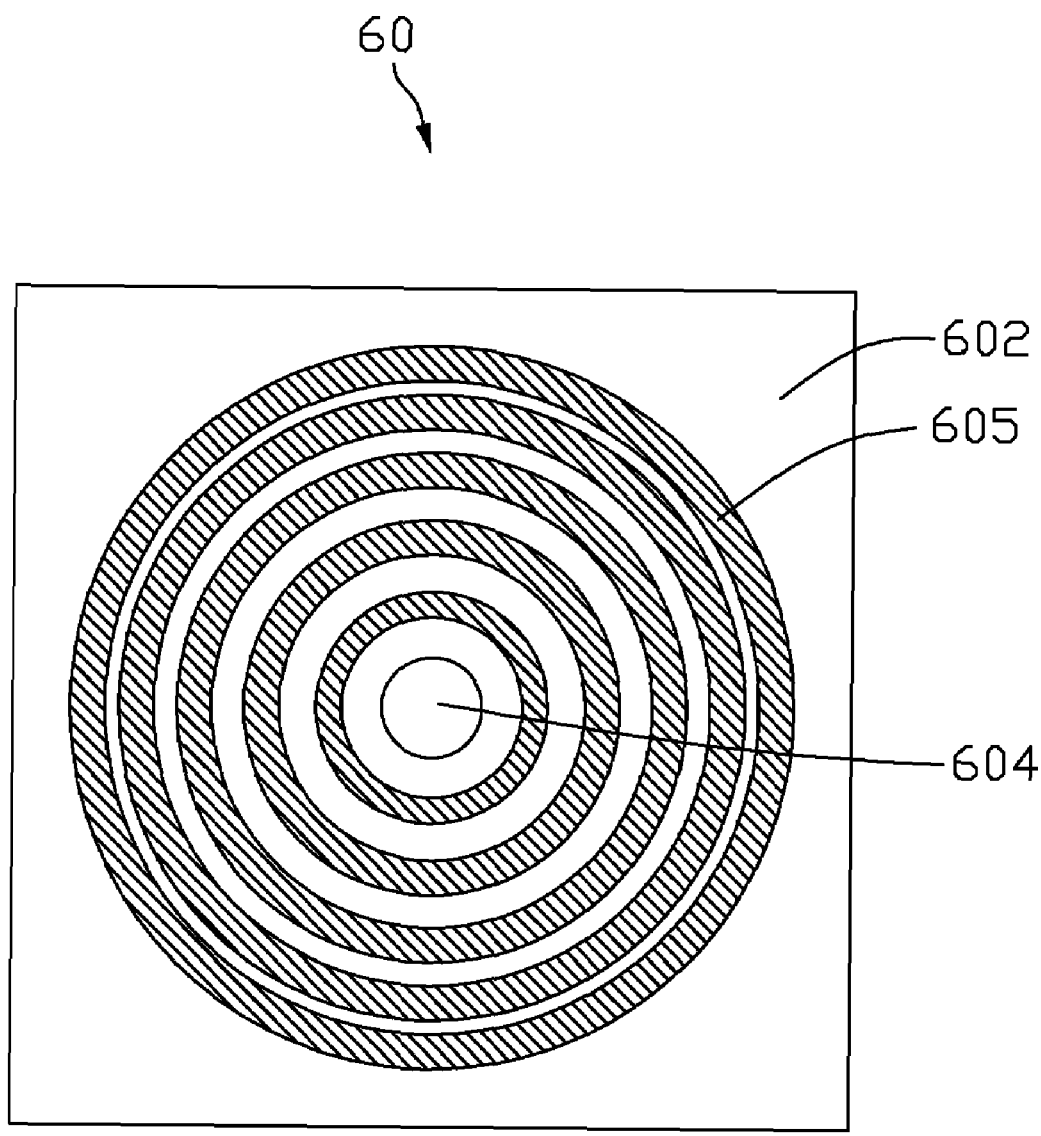

Referring to FIG. 6, a second arrangement of the diffusion strips is shown. A diffusion layer 605 formed on a light output surface 602 of an optical plate 60 includes five (or more) circular strips arranged apart. A center of each of the circular strips aligns within a portion of the lamp-receiving portion 604 of the optical plate 60. Furthermore, a pitch between adjacent circular strips decreases along a direction away from the lamp-receiving portion 604.

Figure 7:
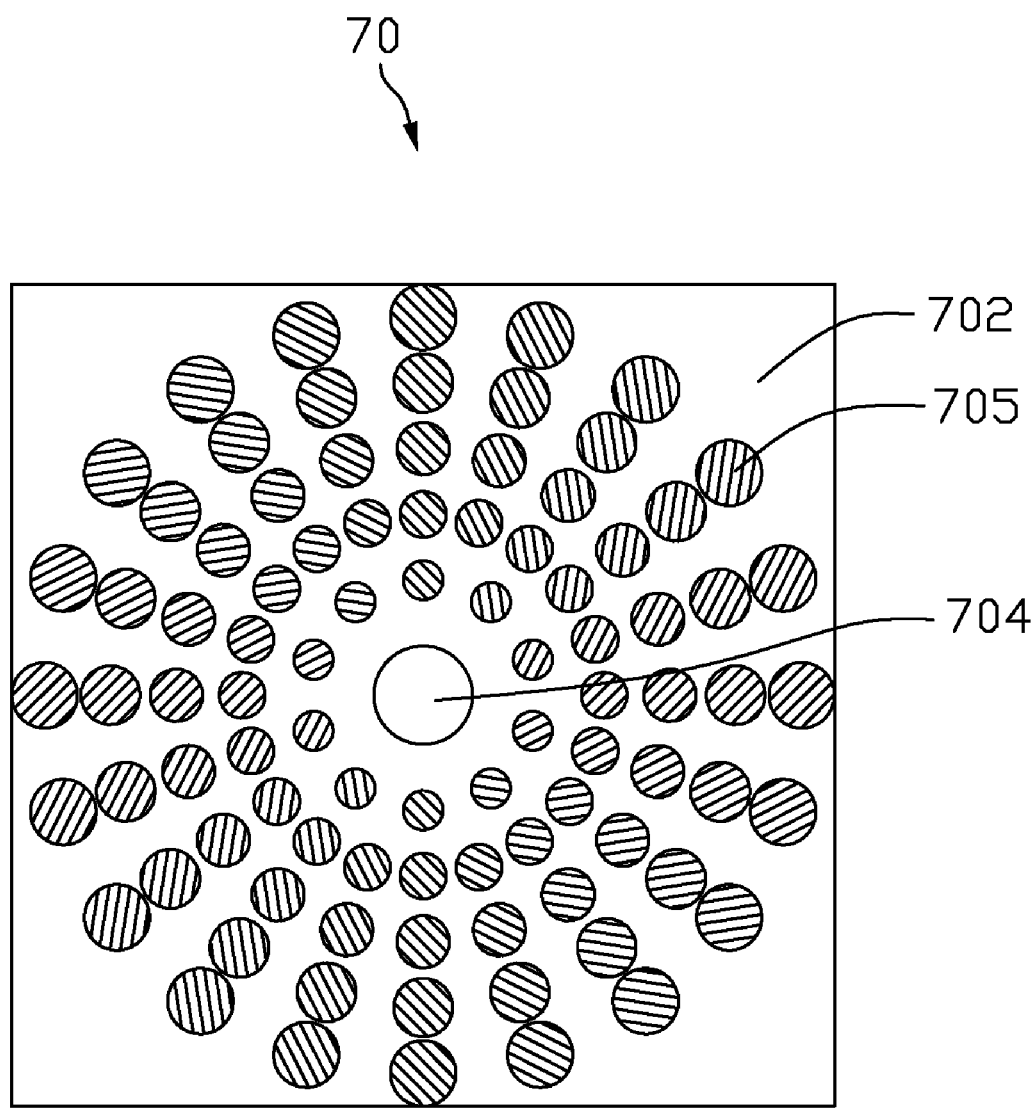

Referring to FIG. 7, a third arrangement of the diffusion dots is shown. A diffusion layer 705 formed on a light output surface 702 of an optical plate 70 includes a plurality of round dots. The round dots are arranged radially from a lamp-receiving portion 704. Furthermore, a diameter of each the round dot increases along a direction away from the lamp-receiving portion 704.

Figure 8:
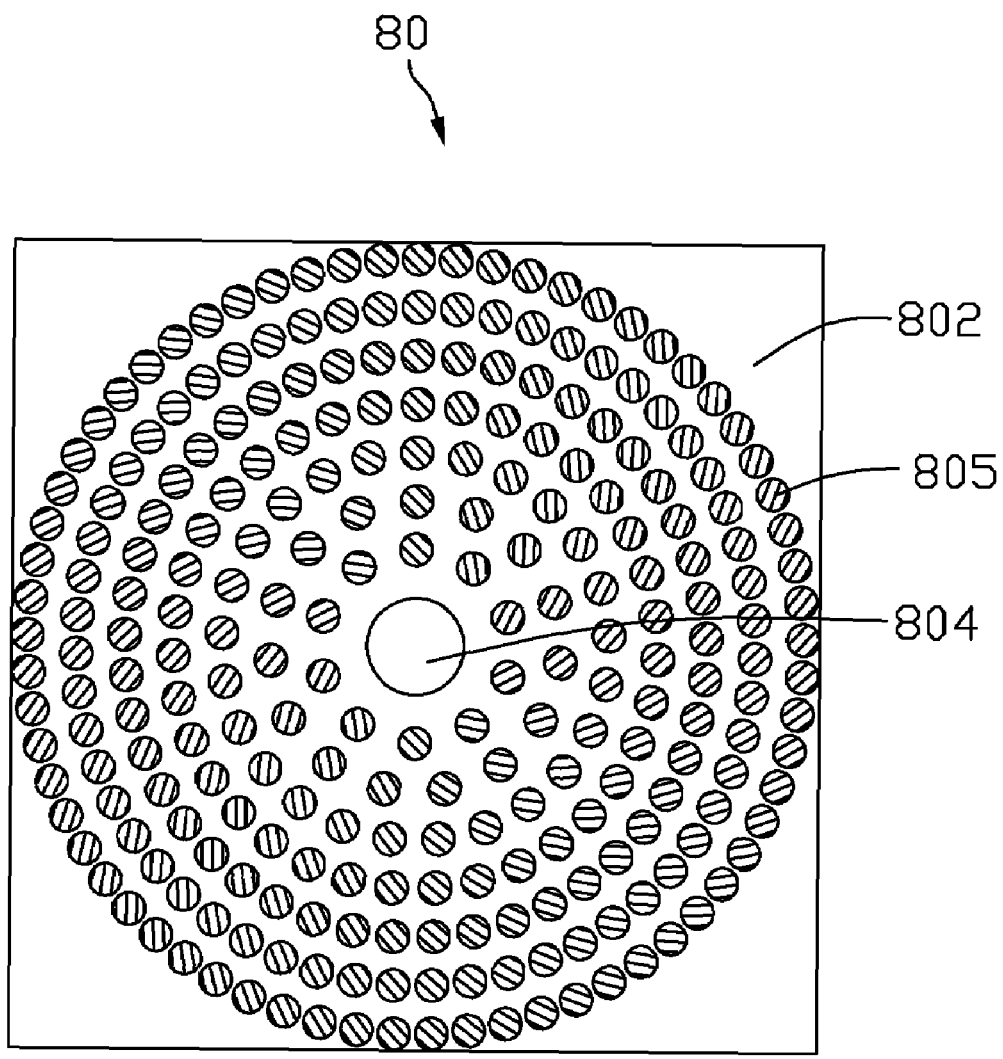
Figure 9:
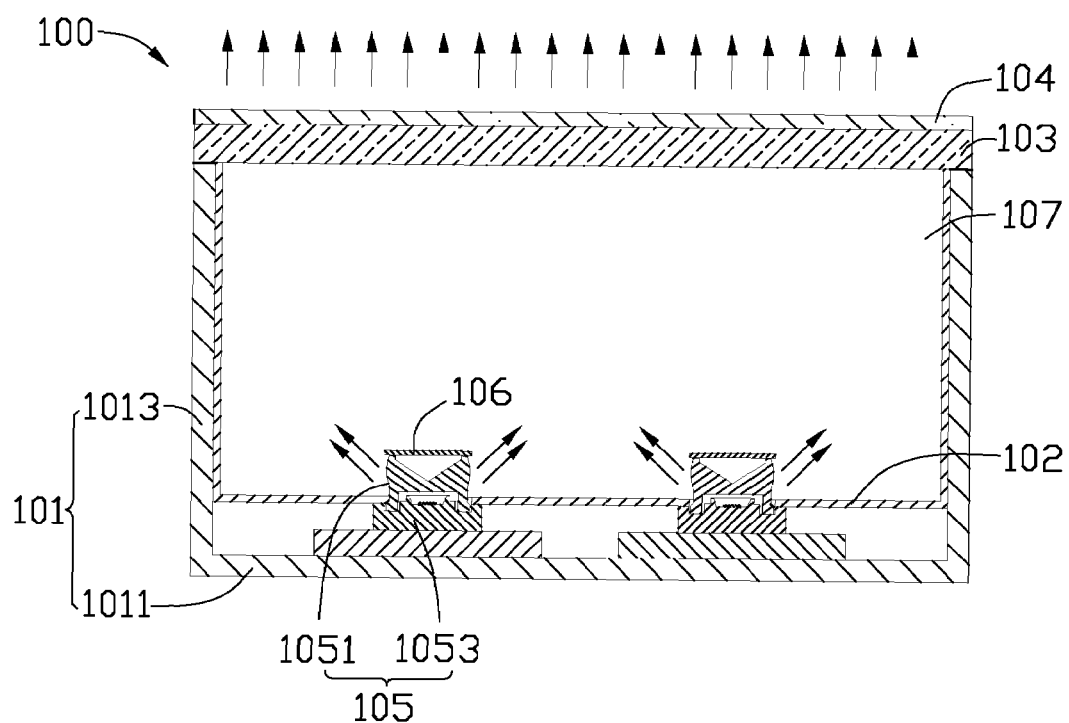
FIG. 9 is a side cross-sectional view of a conventional backlight module.

Referring to FIG. 8, a fourth arrangement of the diffusion dots is shown. A diffusion layer 805 formed on a light output surface 802 of an optical plate 80 includes a plurality of round dots. The round dots are substantially identical to each other. The round dots are arranged separately along a plurality of imaginary circles that have a same center. The center of each of the imaginary circles aligns within a portion of a lamp-receiving portion 804. Furthermore, a distribution density of the round dots of each imaginary circle increases along a direction away from the lamp-receiving portion 804.

It is noted that the scope of the present backlight module is not limited to the embodiments described above. For example, in a backlight module using a plurality of optical plates combined side by side, a plurality of red, green, and blue colored LEDs can be inserted into the lamp-receiving portions of the combined optical plates correspondingly, such that a mixed white surface light can be obtained. Further, the above optical plates can be polygonal or circular. In addition, it is to be understood that other kinds of point light source, such as field emission lamps and so on, can replace the LEDs in above embodiments.

Finally, while various embodiments have been described and illustrated, the invention is not to be construed as being limited thereto. Various modifications can be made to the embodiments by those skilled in the art without departing from the true spirit and scope of the invention as defined by the appended claims.

What is claimed is:

1. An optical plate comprising:
   at least one transparent plate unit having:
   a light output surface,
   a bottom surface opposite to the light output surface;
   a diffusion layer formed on the light output surface; and
   at least one lamp-receiving portion defined in the bottom surface, wherein the diffusion layer comprises a plurality of circular strips arranged separately; a center of each of the circular strips aligns within a portion of the at least one lamp-receiving portion; and a radial thickness of each circular strip increases with increasing radius.

2. The optical plate according to claim 1, wherein the diffusion layer comprises transparent resin matrix material, and diffusion particles dispersed in the transparent resin matrix material.

3. The optical plate according to claim 2, wherein the transparent resin matrix material is acrylic resin.

4. The optical plate according to claim 2, wherein the diffusion particles are selected from a group consisting of glass beads, silicon dioxide particles, polymethyl methacrylate particles, and any combination thereof.

5. The optical plate according to claim 1, wherein the diffusion layer has a uniform thickness and covers the light output surface entirely.

6. The optical plate according to claim 1, wherein the lamp-receiving portion is selected from one of a blind hole and a through hole communicating between the light output surface and the bottom surface.

7. A backlight module comprising:
   a housing having a base and a plurality of sidewalls extending from a periphery of the base, the base and the sidewalls cooperatively forming an opening;
   at least one point light source disposed on the base, each of the at least one point light source having a light-emitting portion;
   at least one reflective member is positioned above the top of the light-emitting portion; and
   an optical plate positioned in the housing, the optical plate including at least one transparent plate unit having:
   a light output surface,
   a bottom surface opposite to the light output surface;
   a diffusion layer formed on the light output surface; and
   at least one lamp-receiving portion defined in the bottom surface; wherein the light-emitting portion of the at least one point light source is inserted in the lamp-receiving portion correspondingly, the diffusion layer facing the opening of the housing, wherein the diffusion layer comprises a plurality of circular strips arranged separately; a center of each of the circular strips aligns within a portion of the at least one lamp-receiving portion; and a radial thickness of each circular strip increases with increasing radius.

8. The backlight module according to claim 7, further comprising a light reflective plate defining a through hole therein, the light reflective plate being disposed underneath the bottom surface of the optical plate, and the at least one point light source passing through the light reflective plate via the through hole.

9. The backlight module according to claim 8, wherein the light reflective plate further comprises a plurality of reflective sidewalls extending around a periphery thereof and the reflective sidewalls are in contact with the corresponding sidewalls of the housing.

10. The backlight module according to claim 7, wherein the housing is made of metal materials, and has high reflectivity inner surfaces.

11. The backlight module according to claim 7, further comprising a high reflectivity film deposited on inner surfaces of the base and the sidewalls of the housing.

12. The backlight module according to claim 7, wherein the lamp-receiving portion is selected from one of blind hole and through hole communicating between the light output surface and the bottom surface.

13. An optical plate comprising:
   at least one transparent plate unit having:
   a light output surface,
   a bottom surface opposite to the light output surface;
   a diffusion layer formed on the light output surface; and
   at least one lamp-receiving portion defined in the bottom surface, wherein the diffusion layer comprises a plurality of circular strips arranged separately; a center of each of the circular strips aligns within a portion of the at least one lamp-receiving portion; and a pitch between the two adjacent circular strips decreases along a direction away from the at least one lamp-receiving portion.

* * * * *